US009191898B2

(12) United States Patent
Attar et al.

(10) Patent No.: US 9,191,898 B2
(45) Date of Patent: Nov. 17, 2015

(54) METHOD AND APPARATUS FOR ADAPTIVE RECEIVE DIVERSITY CONTROL FOR POWER REDUCTION

(75) Inventors: Rashid Ahmed Akbar Attar, San Diego, CA (US); Jing Sun, San Diego, CA (US); Won-Joon Choi, San Diego, CA (US); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 13/614,818

(22) Filed: Sep. 13, 2012

(65) Prior Publication Data

US 2013/0242772 A1 Sep. 19, 2013

Related U.S. Application Data

(60) Provisional application No. 61/550,836, filed on Oct. 24, 2011, provisional application No. 61/553,768, filed on Oct. 31, 2011.

(51) Int. Cl.
| | |
|---|---|
| H04W 4/00 | (2009.01) |
| H04B 17/02 | (2006.01) |
| H04W 52/02 | (2009.01) |
| H04B 7/08 | (2006.01) |

(52) U.S. Cl.
CPC ......... *H04W 52/0274* (2013.01); *H04B 7/0871* (2013.01); *H04B 7/0877* (2013.01); *H04W 52/0225* (2013.01)

(58) Field of Classification Search
None
See application file for complete search history.

(56) References Cited

U.S. PATENT DOCUMENTS

| | | | |
|---|---|---|---|
| 6,088,337 A | 7/2000 | Eastmond et al. | |
| 7,586,863 B2 | 9/2009 | Tu et al. | |
| 7,925,302 B2 * | 4/2011 | Ulupinar et al. | 455/562.1 |
| 2008/0259893 A1 | 10/2008 | Murata et al. | |
| 2009/0168914 A1 | 7/2009 | Chance et al. | |
| 2010/0279702 A1 | 11/2010 | Kazmi et al. | |
| 2011/0201295 A1 | 8/2011 | Ma et al. | |

(Continued)

FOREIGN PATENT DOCUMENTS

| | | |
|---|---|---|
| JP | 2001244861 A | 9/2001 |
| JP | 2003523126 A | 7/2003 |

(Continued)

OTHER PUBLICATIONS

International Search Report and Written Opinion—PCT/US2012/061692—ISA/EPO—Feb. 20, 2012.
Japanese Office Action; Mail Date Jul. 7,2015; JP Reference: 8TF/8YKA-B0014P0432.
Japanese Office Action Translation Provided by JPO Counsel; Mail Date Jul. 7, 2015; JP Reference: 8TF/8YKA-B0014P0432.

*Primary Examiner* — Jutai Kao
(74) *Attorney, Agent, or Firm* — QUALCOMM IP Department; James Hunt Yancey, Jr.

(57) ABSTRACT

Methods and devices performing the method for wireless communications are disclosed, where the method includes retrieving historical communications information for a plurality of receive chains for receiving communications from a wireless node; determining a number of receive chains from the plurality of receive chains to enable in a discontinuous reception mode based on the historical communications information; and enabling the number of receive chains to receive a communication from the wireless node in a communications cycle. Other aspects, embodiments, and features are also claimed and described.

60 Claims, 12 Drawing Sheets

(56) References Cited

U.S. PATENT DOCUMENTS

2012/0013803 A1* 1/2012 Oren .......................... 348/554
2014/0220916 A1* 8/2014 Mujtaba et al. ............... 455/140

FOREIGN PATENT DOCUMENTS

| WO | 0159945 A1 | 8/2001 |
| WO | 2008071600 A1 | 6/2008 |

* cited by examiner

METHOD AND APPARATUS FOR ADAPTIVE RECEIVE DIVERSITY CONTROL FOR POWER REDUCTION

CROSS REFERENCE TO RELATED APPLICATIONS & PRIORITY CLAIM

The present application for patent claims priority to provisional application No. 61/550,836, entitled "Adaptive Receive Diversity Control for Power Reduction in Idle Mode" filed Oct. 24, 2011, and provisional patent application No. 61/553,768, entitled "Adaptive Receive Diversity in Idle Mode and Access State", filed Oct. 31, 2011, both of which are assigned to the assignee hereof and hereby expressly incorporated by reference herein as if fully set forth below and for all applicable purposes.

TECHNICAL FIELD

Embodiments of the present invention relate generally to wireless communication, and more specifically, to adaptive receive diversity control for power reduction.

BACKGROUND

Wireless communications systems are widely deployed to provide various types of communication content such as voice, video, packet data, messaging, broadcast, and so on. These systems may be accessed by wireless devices of multiple users sharing the available system resources (e.g., time, frequency, and power). Examples of such wireless communications systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Generally, a wireless device may be used to receive voice and/or data communications through the wireless communication systems. When receiving data communications, it is generally desirable to have relatively high data rates for communications to and from the wireless devices in order to enhance user experience. One commonly used technique to increase data rates uses multiple receive and/or transmit chains to receive and/or send data communications on multiple wireless communications channels simultaneously. Often, data is sent from a wireless device using a single transmit chain using a primary antenna that operates in duplex with a receive chain that uses the primary antenna, and a second receive chain, commonly referred to as a diversity receive chain, that uses a secondary antenna.

The use of multiple transmit and/or receive chains is effective in enhancing user experience through higher data transmission rates. However, the use of multiple transmit and/or receive chains may also adversely impact power consumption in the wireless device. Such wireless devices are generally battery operated, and it is desirable to increase the amount of time a wireless device can operate using only battery power.

BRIEF SUMMARY OF SOME EMBODIMENTS

The following presents a simplified summary of one or more aspects of a method and apparatus for adaptive receive diversity control for power reduction in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes
retrieving historical communications information for a plurality of receive chains for receiving communications from a wireless node; determining a number of receive chains from the plurality of receive chains to enable in a discontinuous reception mode based on the historical communications information; and enabling the number of receive chains to receive a communication from the wireless node in a communications cycle.

According to various aspects, an apparatus for wireless communications includes a plurality of receive chains for receiving communications from a wireless node; and a control module, operably coupled with the plurality of receive chains to manage the plurality of receive chains in a discontinuous reception mode. The control module configured to retrieve historical communications information for the apparatus; determine a number of receive chains from the plurality of receive chains to enable based on the historical communications information; and enable the number of receive chains to receive a communication from the wireless node in a communications cycle.

According to various aspects, an apparatus for wireless communications includes means for retrieving historical communications information for a plurality of receive chains for receiving communications from a wireless node; means for determining a number of receive chains from the plurality of receive chains to enable in a discontinuous reception mode based on the historical communications information; and means for enabling the number of receive chains to receive a communication from the wireless node in a communications cycle.

According to various aspects, a computer program product for wireless communications includes a machine-readable storage medium. The machine-readable storage medium includes instructions executable for retrieving historical communications information for a plurality of receive chains for receiving communications from a wireless node; determining a number of receive chains from the plurality of receive chains to enable in a discontinuous reception mode based on the historical communications information; and enabling the number of receive chains to receive a communication from the wireless node in a communications cycle.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

These and other sample aspects of the disclosure will be described in the detailed description that follow, and in the accompanying drawings, wherein.

Figure 1:
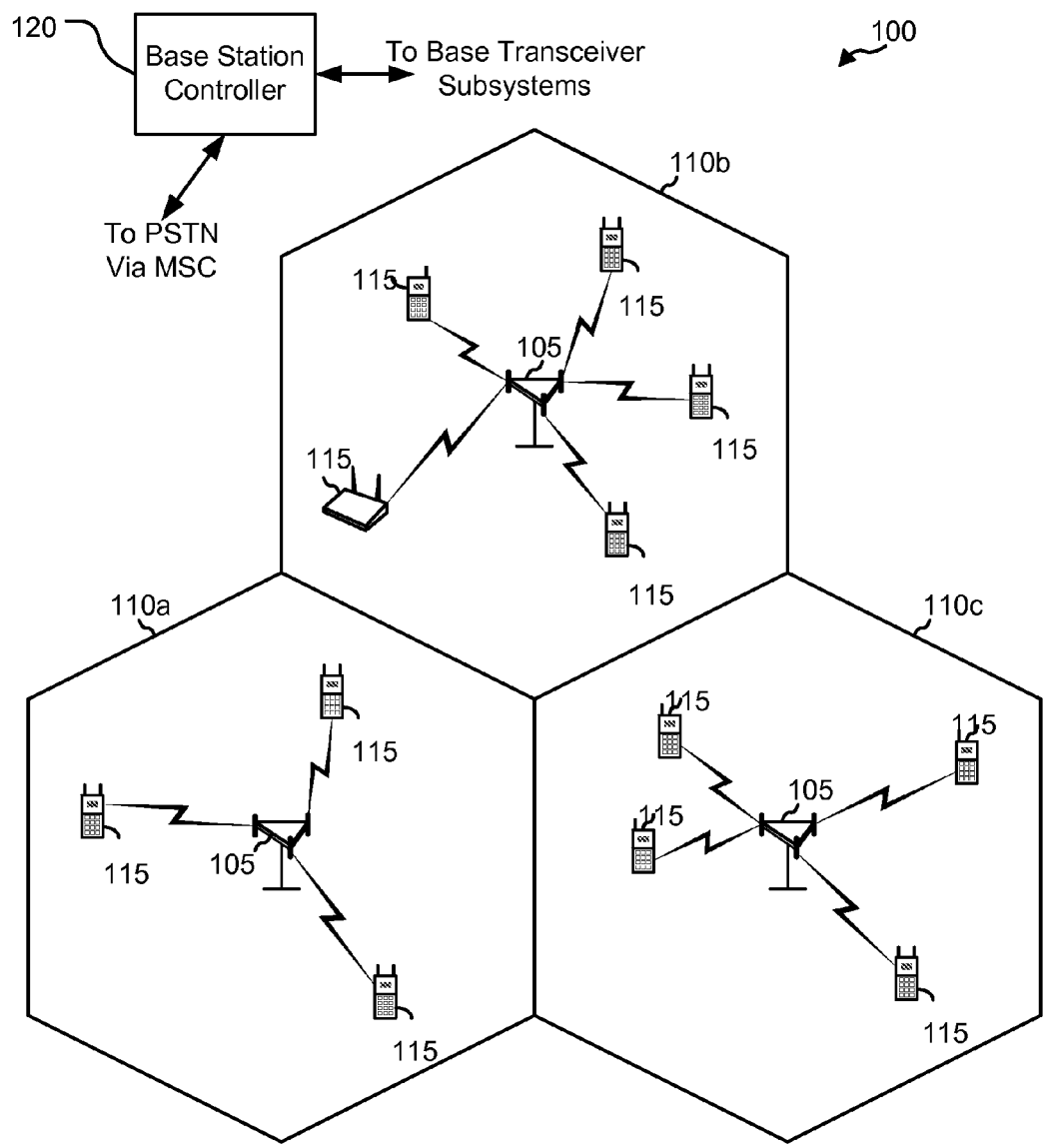
FIG. 1 is a block diagram of a wireless communications system in which various aspects of a reception diversity (RxD) optimization approach may be implemented.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

In the following description, reference is made to the accompanying drawings in which is shown, by way of illustration, specific approaches in which the disclosure may be practiced. The approaches are intended to describe aspects of the disclosure in sufficient detail to enable those skilled in the art to practice the invention. Other approaches may be utilized and changes may be made to the disclosed approaches without departing from the scope of the disclosure. The following detailed description is not to be taken in a limiting sense, and the scope of the disclosure is defined only by the appended claims.

Elements described herein may include multiple instances of the same element. These elements may be generically indicated by a numerical designator (e.g., "110") and specifically indicated by the numerical indicator followed by an alphabetic designator (e.g., "110A") or a numeric indicator proceeded by a "dash" (e.g., "110-1"). For ease of following the description, for the most part element number indicators begin with the number of the drawing on which the elements are introduced or most fully discussed.

The following description provides examples, and is not limiting of the scope, applicability, or configuration set forth in the claims. Changes may be made in the function and arrangement of elements discussed without departing from the spirit and scope of the disclosure. Various aspects may omit, substitute, or add various procedures or components as appropriate. For instance, the methods described may be performed in an order different from that described, and various steps may be added, omitted, or combined. Also, features described with respect to certain aspects may be combined in other aspects.

The discussions herein may involve CDMA and Evolution-Data Optimized (EV-DO) protocols and systems as one example in order to indicate additional details of some aspects of the disclosed approaches. Another example is a complementary device enhancement known as simultaneous (1X) Voice and (EV-DO) Data (SV-DO) that enables CDMA2000 devices to access EV-DO packet data services while in an active 1X circuit-switch voice call. However those of ordinary skill in the art will recognize that aspects of the disclosed approach may be used and included in many other wireless communication protocols and systems.

Management of receive chain diversity processing for a wireless device such as a mobile wireless device in a wireless communications system is described herein. As part of a resource saving technique for a resource such as battery power, the wireless device may enter into a low power mode known as a discontinuous reception mode, where portions of receive chain circuitry of the wireless device may be deactivated for periods where the wireless device is not expecting to transfer data. The discontinuous reception mode may also be referred to as an idle mode. During a discontinuous reception mode, the wireless device is still required to periodically activate one or more of the receive chains in the receive chain circuitry to receive and decode a control channel broadcast by a base station. This includes checking for pages and any updates to overhead messages. If there is no page directed towards the wireless device, it is permitted to go into a sleep mode immediately until the beginning of the next cycle, which may be referred to as a sleep cycle, a control channel cycle, a slot cycle, or a paging cycle. On the other hand, if there is a page for the wireless device, it immediately exits the idle mode, transmits a response on an access channel and begins to continuously monitors the control channel for subsequent messages. If a connection is established, then wireless device is said to be in an active state until the call is terminated—at that point it again enters the idle mode.

In EV-DO, control channel transmission is organized into control channel periods, each with a duration of 5.12 seconds. Each period has 12 control channel cycles, and each control channel cycle in turn consists of 256 slots with a 1.66 millisecond duration per slot. Every wireless device in idle mode monitors one or more control channel cycles in a control channel period, with a particular wireless device being assigned the same set of control channel cycles in every control channel period to monitor. The control channel messages can be delivered to wireless devices in a control channel cycle in either synchronous capsule, asynchronous capsule or sub-synchronous capsule. Synchronous capsules are used to transmit dedicated control channel messages such as page messages, traffic channel assignment messages and access channel acknowledgement messages; or broadcast messages such as sector parameter messages, access parameter messages, sync messages, and quick configuration messages. A synchronous capsule may contain more than one packet and each packet can either be transmitted using 16 slots or 8 slots. Each of the 16 or 8 slots may be referred to herein as sub-packets. Asynchronous capsules can be transmitted any time a synchronous capsule is not transmitted, and contains only one packet. Sub-synchronous capsules are introduced to transmit control channel traffic to wireless device in idle mode that wake up multiple times each control channel cycle. Pages are only transmitted in synchronous and sub-synchronous capsules.

As used herein, a time period in the discontinuous reception mode during which the wireless device has activated (i.e., turned on) the receive chain circuitry will be referred to as a time period when the wireless device is "awake", or in an "awake" mode. Conversely, a time period during which the receive chain circuitry of the wireless device is deactivated will be referred to as a time period when the wireless device is "asleep", "sleeping", or in a "sleep" mode.

During an awake period, the wireless device may use one or more receive chains to receive and decode the control channel. In some aspects of the disclosed approach, the wireless device may activate only one receive chain to attempt to receive and decode the control channel. In other aspects of the disclosed approach, the wireless device may activate two or more receive chains to attempt to decode the control channel in a mode also referred to as Receive (Rx) Diversity (RxD). Activating more than one receive chain may allow for better decoding performance because more power may be received, and because there may be an increase in reception diversity. Activating only one receive chain may use less power than using multiple receive chains, but it may take longer to decode the control channel. Viewed another way, using RxD to decode the control channel may consume more power, but the wireless device may be able to decode the control channel faster, thereby being able to return to a low power mode (e.g., sleep mode) sooner by deactivating its receive chain circuitry and saving power overall. Various approaches are described herein to improve management of RxD for conservation of resources, such as power resources, of the wireless device.

When in a discontinuous reception mode, there is very little information available for a wireless device to use to determine whether or not to use RxD. Due to the lack of information, in one aspect of the disclosed approach, a determination is performed whether to use RxD using measurements from previous discontinuous reception cycles. In another aspect of the disclosed approach, certain assumptions are made and an attempt to acquire a control channel may be made initially with or without diversity. Many aspects of the disclosed approach differs from the use of RxD when the wireless device is in a connected or active mode, where instantaneous measurements of channel conditions or determinations based on applications currently being run may be used to determine whether or not to use RxD.

FIG. 1 is a block diagram illustrating an example of a wireless communications system 100. The system 100 includes base stations 105, wireless devices 115, and a base station controller 120. The system 100 may be capable of supporting operation on multiple carriers (waveform signals of different frequencies). Multi-carrier transmitters may transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 105 may wirelessly communicate with the wireless devices 115 via a base station antenna. The base stations 105 are configured to communicate with the wireless devices 115 under the control of the controller 120. Each of the base station 105 sites can provide communication coverage for a respective geographic area. The coverage area 110 for each base station 105 here is identified as 110-a, 110-b, or 110-c. The coverage area 110 for a base station 105 may be divided into sectors (not shown, but making up only a portion of the coverage area). The system 100 may include base stations 105 of different types (e.g., macro, micro, and/or pico base stations).

The wireless devices 115 may be dispersed throughout the coverage areas 110. The wireless devices 115 may be referred to as mobile stations, wireless devices, access terminals (ATs), user equipments (UEs) or subscriber units. The wireless devices 115 may include cellular phones and wireless communications devices, but may also include personal digital assistants (PDAs), other handheld devices, netbooks, notebook computers, etc.

Figure 2:
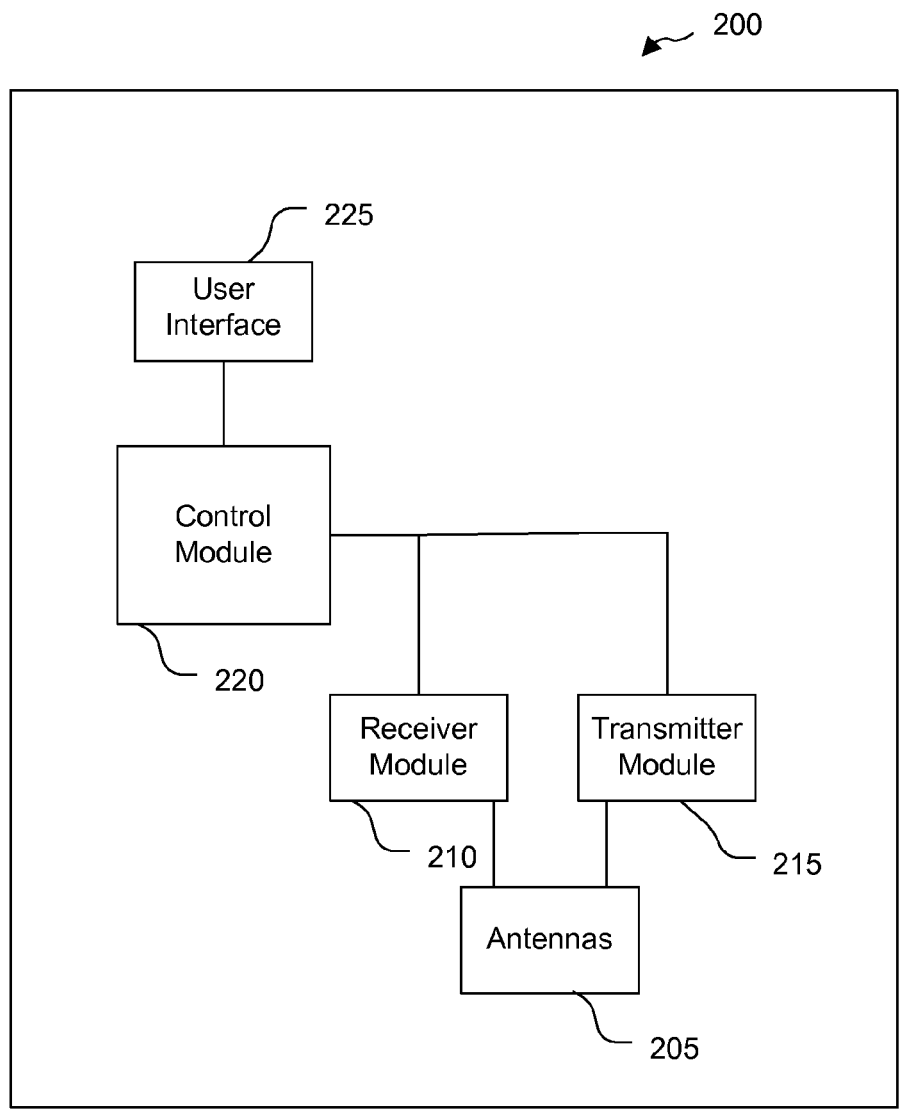
FIG. 2 is a block diagram of an exemplary wireless device configured in accordance with various aspects of the disclosed approach in which various aspects of the RxD optimization approach may be implemented.

FIG. 2 is a block diagram illustration of an exemplary wireless device 200 that may represent one of the mobile devices 115. The wireless device 200 may have any number of different configurations, such as personal computers (e.g., laptop computers, netbook computers, tablet computers, etc.), cellular telephones, PDAs, digital video recorders (DVRs), internet appliances, gaming consoles, e-readers, etc. The wireless device 200 may have a mobile configuration, having an internal power supply (not shown), such as a battery, to facilitate mobile operation. The wireless device 200 includes a group of two or more antennas 205, which may be used in the transmission/reception of wireless communications to/from the wireless device 200. In some aspects of the disclosure, the group of antennas 205 include a primary antenna and one or more secondary antennas, with the primary antenna used for transmission and reception of wireless communications on a wireless communications channel, and the one or more secondary antennas used for reception of wireless communications on the same wireless communications channel in order to provide RxD. In some other aspects, the one or more secondary antennas may be used for reception of wireless communications on a different wireless communications channel. In some devices, wireless communications may be received on more than two wireless communications channels, with such devices including additional antennas as necessary to receive wireless communications on three or more different wireless communications channels.

A receiver module 210 and a transmitter module 215 are coupled to the group of antennas 205. The receiver module 210 receives signals from the group of antennas, demodulates and processes the signals, and provides the processed signals to a control module 220. Similarly, the transmitter module 215 receives signals from the control module 220, processes and modulates the signals, and transmits the processed and modulated signals using the group of antennas 205. In some aspects of the disclosure, the transmitter module 215 and the receiver module 210 may be incorporated into a single transceiver module. The control module 220 performs processing tasks related to the operation of the wireless device 200, and may be coupled to a user interface 225 that allows a user of the wireless device 200 to select various functions, control, and interact with the mobile device 200. The various components the wireless device 200 may be in communication with some or all of the other components of the wireless device 200 via one or more busses (not shown), for example.

Figure 3:
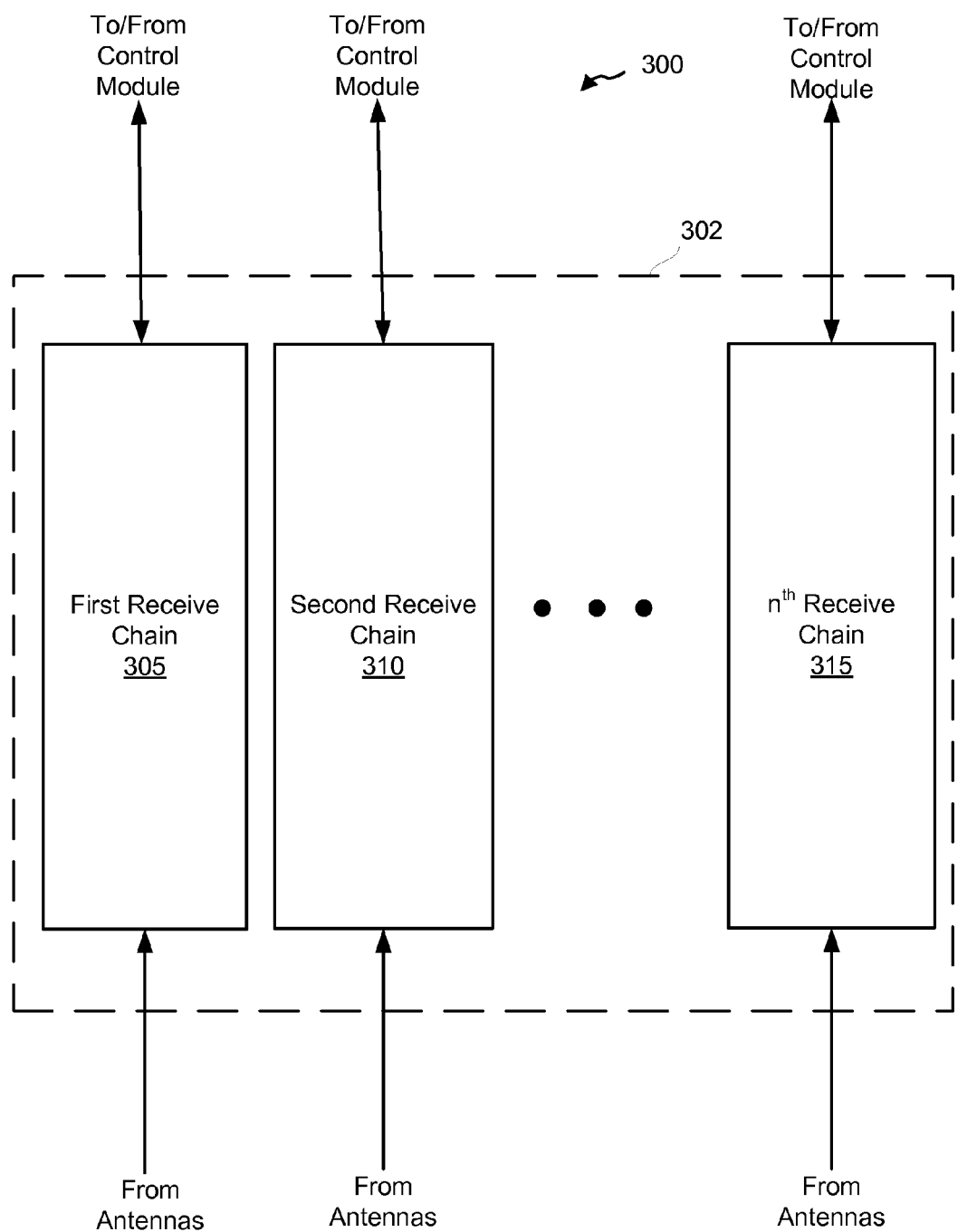
FIG. 3 is a block diagram of an exemplary receiver module of the wireless device of FIG. 2 according to some embodiments of the present invention.

FIG. 3 is a block diagram illustration of an exemplary receiver module 300 that may be used to implement the receiver module 210 of mobile device 200. The receiver module 300 of FIG. 3 includes multiple receive chains 302 including a first receive chain 305, and a second receive chain 310 through an $n^{th}$ receive chain 315. Each of the receive chains 305, 310-315 are coupled to a respective antenna in a group of antennas 205 and receive wireless communications signals from the group of antennas 205. The first receive chain 305, for example, may be coupled to a primary antenna of the group of antennas 205 in the wireless device 200 and share the primary antenna with the transmitter module 215. The second receive chain 310 through the $n^{th}$ receive chain 315, in some aspects of the disclosure, are coupled to a respective one of the secondary antennas in the group of antennas 205 to provide an enhanced mode for reception of data at the wireless device using RxD. Each of the receive chains 305, 310-315 include components that are used in such receive chains to perform such tasks as related to reception and filtering of incoming signals, frequency conversion and gain control, and baseband processing to provide a digital output to the control module 220. Such components are well understood and need not be described in detail here. In various aspects of the disclosed approach, as will be described in more detail below, each of the first receive chain 305 and the second receive chain 310 through $n^{th}$ receive chain 315, may be enabled and disabled under certain conditions to reduce overall power consumption of the wireless device 200. Reference to several examples below will be made using two exemplary receive chains, with the understanding that more than two receive chains may be present in a receiver module 210, as illustrated in the exemplary receiver module 300 in FIG. 3, and that only two receive chains are described in various examples for a more simplified discussion and illustration of the concept.

Figure 4:
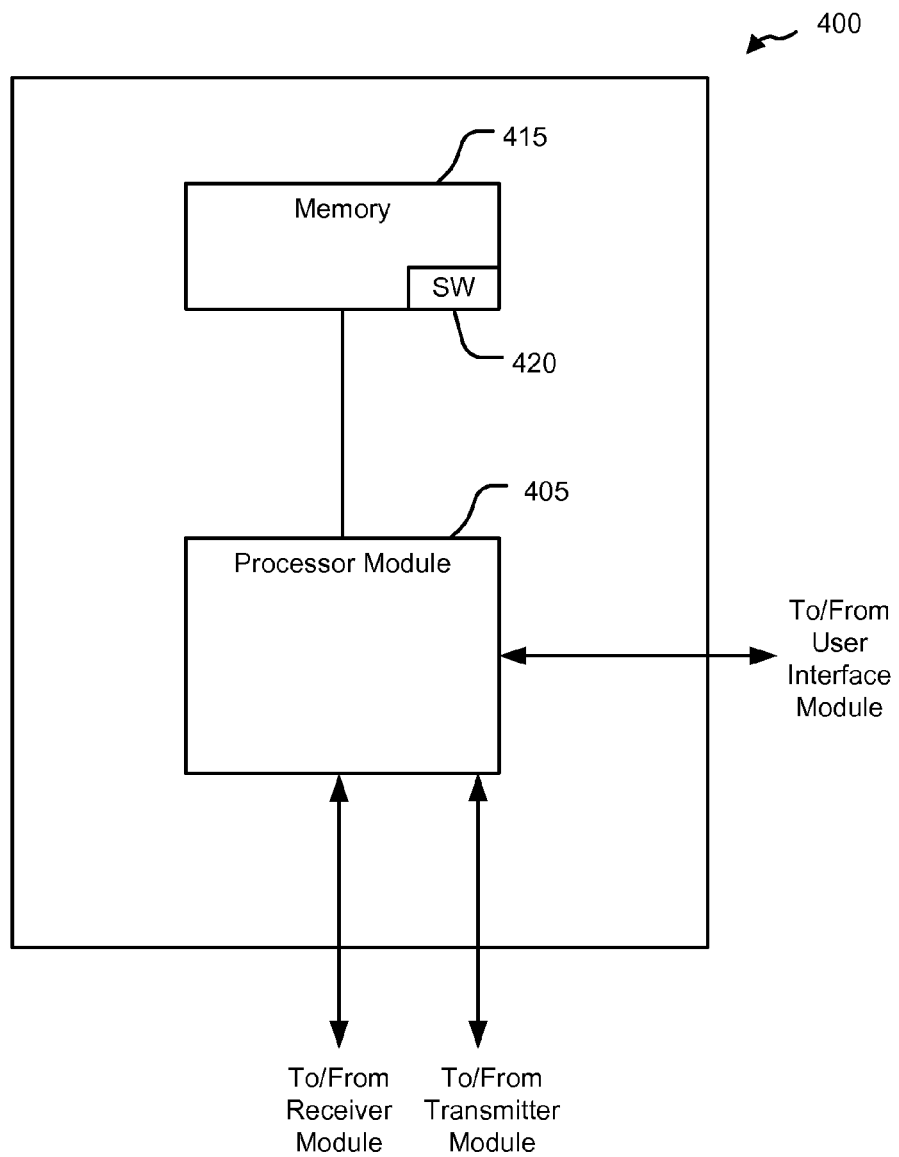
FIG. 4 is a block diagram of an exemplary control module of the wireless device of FIG. 2 according to some embodiments of the present invention.

FIG. 4 illustrates a control module 400 that may be used to implement the control module 220 of the wireless device 200 according to some aspects of the disclosed approach. The control module 400 includes a processor module 405. The control module 400 also may include a memory 415. As non-limiting examples, the memory 415 may include Random Access Memory (RAM), Read-Only Memory (ROM), Non-Volatile Random Access Memory (NVRAM), or combinations thereof. The memory 415 may store computer-readable, computer-executable software code 420 containing instructions that are configured to, when executed, cause the processor module 405 to perform various functions of the wireless device 200 (e.g., call processing, message routing, execution of applications, etc.). Alternatively, the software code 420 may not be directly executable by the processor module 405 but may be configured to cause the processor module 405 (e.g., when compiled and executed) to perform functions described herein, such as the processes shown in FIGS. 6-12. The software code 420 may also, when executed, cause the processor module 405 to track and record historical usage data relating to, for example, the communications characteristics of the packets received and transmitted by the wireless device 200. The historical communications data may be stored in memory 415 and accessed and updated as needed by the processor module 405.

The processor module 405 may include an intelligent hardware device, e.g., a central processing unit (CPU) such as those made by Intel® Corporation or AMD®, a microcontroller, an application specific integrated circuit (ASIC), etc. The processor module 405 may include a speech encoder (not shown) configured to receive audio via a microphone, convert the audio into packets representative of the received audio, provide the audio packets to the transmitter module 215, and provide indications of whether a user is speaking. The processor module 405 may execute one or more applications that a user may access, through the user interface 225, to generate digital content that is to be transmitted from the wireless device 200. Such digital content may include email or text message communications, to name but two examples, that the processor module 405 may convert into data packets, and provide the data packets to the transmitter module 215.

Figure 5:
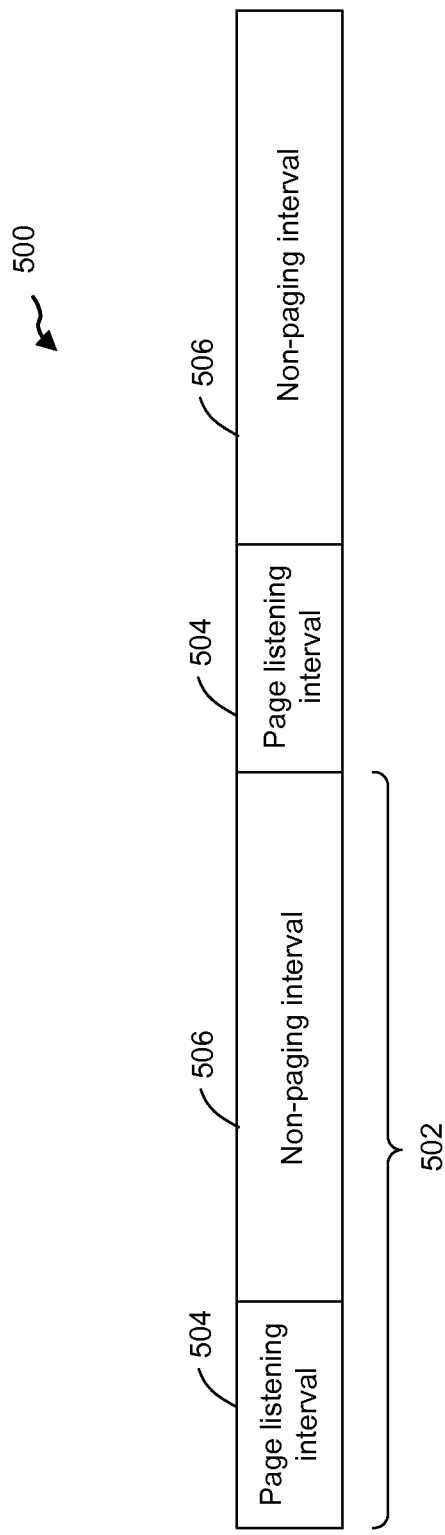
FIG. 5 is a timing diagram for a CDMA paging cycle used in the wireless network of FIG. 1 according to some embodiments of the present invention.

FIG. 5 illustrates a generalized representation of a plurality of paging cycles 500 that may be used in the system 100 of FIG. 1, where one paging cycle of the CDMA cycles 500 may be referred to herein as a control cycle 502. The control cycle 502 includes a page listening interval 504, which may be referred to herein more generically as a control interval 504. The control cycle 502 also includes a non-paging interval 506. As non-limiting examples, in CDMA, as discussed above, a control cycle 502 may include many slots and be a duration of about 5.12 seconds. A control interval 504 may include only a few of those slots (e.g., about 20-30 slots) and may last for only a few 10's of milliseconds.

In general, the wireless device 200 may monitor the control cycle 502 for a control channel in the control interval 504 to determine if it may need to transmit or receive information in the form of voice, data, or a combination thereof. If the control interval 504 indicates that there is nothing for the receiver module 210 to do for this control cycle 502, the receiver module 210 may remain in a mode referred to as an idle mode because it does not need to process any active voice or data transmissions. In one aspect of the idle mode, the wireless device 200 may enter a sleep mode, for such purposes as implementing the discontinuous reception mode, during the rest of the control cycle 502 by disabling certain functions. Functions that are disabled may include one or more receive chains.

The sleep mode may be designed so that the wireless device 200 only wakes up (i.e., activates its receive chain circuitry) to listen to the base station 105 to receive and decode a control channel in the control interval 504, then returns to sleep mode again (i.e., deactivates its receive chain circuitry) if it determines that it does not need to stay awake for the rest of the control cycle 502. Modern wireless devices such as the wireless device 200 are usually equipped with two or more receive chains, as discussed above. Receiver performance will generally be better with more receive chains, but more power will be needed to drive those additional receive chains. For the wireless device 200, using a single receive chain for decoding the control channel during the control interval 504 may save power by not driving any other receive chains, but it may take longer to decode messages. As a result, if a message on the control channel indicates that the wireless device 200 may enter the sleep mode (e.g., no data is to be transmitted to the wireless device 200), the wireless device 200 may have to stay awake for a longer time period until that message is decoded. Staying awake for a longer time period requires more power. On the other hand, if more receive chains are turned on, the wireless device 200 may finish decoding earlier and may return to sleep mode earlier to save power. Aspects of the disclosed approach attempts to adaptively estimate whether enabling additional receive chains may result in overall less power consumption by the wireless device 200 being able to decode the necessary messages in the control interval 504 earlier and thus returning to the sleep mode earlier.

As a non-limiting example, an EVDO control channel may include a control interval 504 that may include 8 to 16 subpackets. The first subpacket may include all information needed for the wireless device 200 to decode the control channel and determine if the wireless device 200 may return to sleep mode. Subsequent re-transmissions may include redundant and/or additional information. If the signal received by the wireless device 200 is weak (e.g., where the wireless device 200 may be far away from the base station 105), it may need to collect multiple sub-packets to decode the needed information to determine if it can return to sleep mode. If the wireless device 200 receives a strong signal (e.g., where the wireless device 200 may be close to the base station 105), it may be able to decode the needed information from the earlier packets (e.g., possibly only the first packet) and be able to return to the sleep mode sooner.

In the following disclosed approaches for RxD optimization, it should be noted that the use of multiple receive chains for the RxD mode may refer to the use of the first receive chain 305 with the second receive chain 310, or the use of the first receive chain 305 with any number of additional receive chains from the second receive chain 310 through the n-th receive chain 315. Thus, unless otherwise stated, a reference to an addition of the second reference chain 310 should not limit the use of any additional receive chains. Further, in some implementations, any two or more of the receive chains from any of the first receive chain 305 through the n-th receive chain 315 may also be used in the RxD mode.

FIG. 600 illustrates a generalized RxD optimization for control channel acquisition process 600 where a wireless device such as the wireless device 200 may determine a number of receive chains to enable for decoding a control channel for a current control interval such as the control interval 504. The determination of a number of receive chains to enable may be based on one or more historical communications parameters. The determination of the number of receive chains to enable may also be based on an adaption to current conditions affecting the wireless device 200. The determination may include predicting, based on the one or more historical communications parameters, a performance during the current control interval of any potential scenarios of enabling multiple receive chains.

In one aspect of the disclosed approach, the one or more historical communications parameters may be based on past communications information and is determined at 602. In various aspects of the disclosed approach, a variety of past communications information may be used to determine if multiple receive chains should be used and when extra multiple receive chains should be enabled or disabled. In general, this past communications information may also be referred to herein as channel quality parameters. Such channel quality parameters may include knowledge about the signal strength during one or more previous control intervals, including target signal, interference and noise. Other channel quality parameters may be related to what happened during one or more of the previous control intervals such as which antenna had a higher Carrier to Interference ratio (C/I), and how many subpacket were needed to successfully decode the control interval. For example, if the wireless device 200 was not moving, or moving slowly, and 6 subpackets were required for successful decoding in the last control interval, it may be likely that 6 subpackets may be needed in a current control interval.

In some conditions, it may always be advisable to use multiple receive chains. As a non-limiting example, it may be advisable to enable multiple receive chains for the current control interval when the wireless device 200 could not successfully decode the control channel during the previous control interval. An inability to successfully decode the control channel during the previous control interval may indicate a very weak signal and the wireless device 200 is in danger of losing coverage. In such a case, power consumption may be of a lesser concern than maintaining connection with the base station 105. Thus, past communications information could include past performance information that may or may not take into account the number of receive chains that were enabled in the attempt to decode the control channel during the previous control interval.

Other conditions where the use of multiple receive chains may be advisable, but not necessarily related to control intervals, are during initial acquisition when a single receive chain failed to acquire the channel in the last round, or when a Radio Signal Strength Indicator (RSSI) indicates a very low power signal (.e.g., lower than about -100 dBm). These conditions may also be applicable for an initial acquisition, such that multiple receive chains may be enabled when the RSSI is low or if a decoding process failed with a single receive chain in the previous initial acquisition.

RxD may not be helpful in a number of circumstances. If multiple receive chains are used and the wireless device 200 cannot return to sleep mode earlier than with a single receive chain, then the extra power to power the extra receive chain(s) is wasted. As a non-limiting example, if enabling the second receive chain 310 requires 30% more power relative to enabling just the first receive chain 305, but the wireless device 200 can only go to sleep mode one subpacket earlier, such as after 4 subpackets out of 8 packets rather than 5 subpackets, then there may be power wasted. As another example, when the channel suffers from large time diversity (i.e., where the channel quality is reducing quickly), use of the extra receive chain may not be helpful in successful decoding because the subsequent packets are degrading too quickly. As another non-limiting example, if the group of antennas 205 do not have sufficient spatial diversity, use of an extra antenna may not result in receiving enough additional signal power to justify enabling it and its associated receive chain. Thus, past communications information could include past resource consumption information that may or may not take into account the number of receive chains that were enabled in the attempt to decode the control channel during the previous control interval.

Past communications information may also include the number of receive chains used. For example, it may be desirable to base the decision of how many receive chains to enable in the current control interval based on the number of receive chains enabled in the previous control interval. More specific examples will be described herein.

At 604, once the one or more historical communications parameters have been determined, an analysis of the one or more historical communications parameters may be made to decide if enablement of multiple receive chains has been triggered. In various aspects of the disclosed approach, the analysis would involve comparing the one or more historical communications parameter values with one or more thresholds. Although many examples will be provided herein, a non-limiting example may include triggering the enablement of multiple receive chains if the one or more historical communications parameters indicates that multiple receive chains were used in the previous control interval. Another non-limiting example may involve the one or more historical communications parameters indicating that previous channel quality was poor. Yet another non-limiting example may involve the one or more historical communications parameters indicating that use of the previous amount of receive chains resulted in either a failure to decode the control channel within a certain number of subpackets, or completely. Yet another non-limiting example may involve the one or more historical communications parameters indicating that use of the previous amount of receive chains resulted in a use of power above a particular threshold.

Depending on the determination, if multiple receive chains are to be enabled, then multiple receive chains may be enabled at 682 and an attempt to receive and decode the control channel may be performed with the multiple receive chains. Otherwise, if only a single receive chain is to be enabled, then operation continues at 684 and an attempt to receive and decode the control channel may be performed with the single receive chain. In either case, once a determined number of receive chains have been enabled, whether one or several, and an attempt to receive and decode the control channel has been performed, operation continues at 610.

At 610, the wireless device 200 may determine if the control channel was decoded successfully using either multiple receive chains in 682, or a single receive chain 684. It may also be determined if the subpacket is the last subpacket in the current control interval. If either of the conditions are true, then operation continues at 630. Otherwise, operation continues at 620.

At 630, where the control channel is decoded successfully, the wireless device 200 may perform any necessary processes based on the results of the attempted decoding. In a non-limiting example, the wireless device 200 may enter into the sleep mode if the control channel indicates that no data is destined for the wireless device 200. In another non-limiting example, the wireless device 200 may enter into the sleep mode if it was not possible to decode the control channel. In still yet another non-limiting example, the wireless device 200 may enter into an access mode if it needs to respond to a paging message decoded from the control channel.

At 620, one or more current communications parameters are updated based on the last control channel decode attempt. Other information may be related to previous subpacket decoding, but the information is obtained within the current control interval. This information may be more temporally relevant (e.g., only a few milliseconds old as opposed to the 5 or more seconds for information from previous control cycles). The one or more current communications parameters may include, if multiple receive chains were used, which receive chain had a better Carrier to Interference (C/I) ratio. Further, with either one or multiple receive chains, and information about the channel quality experienced so far for each receive chain, an estimate may be made as to how many more subpackets may be needed to successfully decode the control interval. In other words, in some aspects of the disclosed approach, the wireless device 200 may also determine the likelihood of the control channel being decoded successfully. As yet another non-limiting example, the one or more current communications parameters may include such as information as target signal, interference and noise, may also be used. As yet another non-limiting example, information may relate to relative power consumption with different numbers of receive chains enabled. Thus, power consumption may be estimated and/or measured for a given receive chain and this information used in making receive chain enabling and disabling decisions. For example, enabling two receive chains may require 30% more power than enabling one receive chain, and it may not be desirable to enable the second receive chain if the expected power saving from being able to decode the control channel is not expected to warrant the expenditure of this additional power. Once the one or more current communications parameters are updated, operation continues at 622.

At 622, the number of receiver chains to be used in the decoding of the control channel is determined. In one aspect of the disclosed approach, one or more of the current communications parameters updated in 620 may be compared to one or more thresholds to determine if a trigger to enable multiple receive chains has been met. In a non-limiting example, if the one or more current communications parameters indicates that it is unlikely that the current number of enabled receive chains will successfully decode the control channel, then the number of enabled receive chains may be changed. In another non-limiting example, it may be determined that once multiple receive chains have been enabled, multiple receive chains may remain enabled for one or more future control channel decoding attempts. In this example, the current communications parameter may simply represent the number of receive chains that are enabled.

If multiple receive chains are to be enabled, operation returns to 682, where multiple receive chains may be enabled to attempt to decode the control channel, as described previously. Otherwise, if only a single receive chain is to be enabled, operation returns to 684, where the single receive chain may be enabled to attempt to decode the control channel, as described previously.

Figure 6:
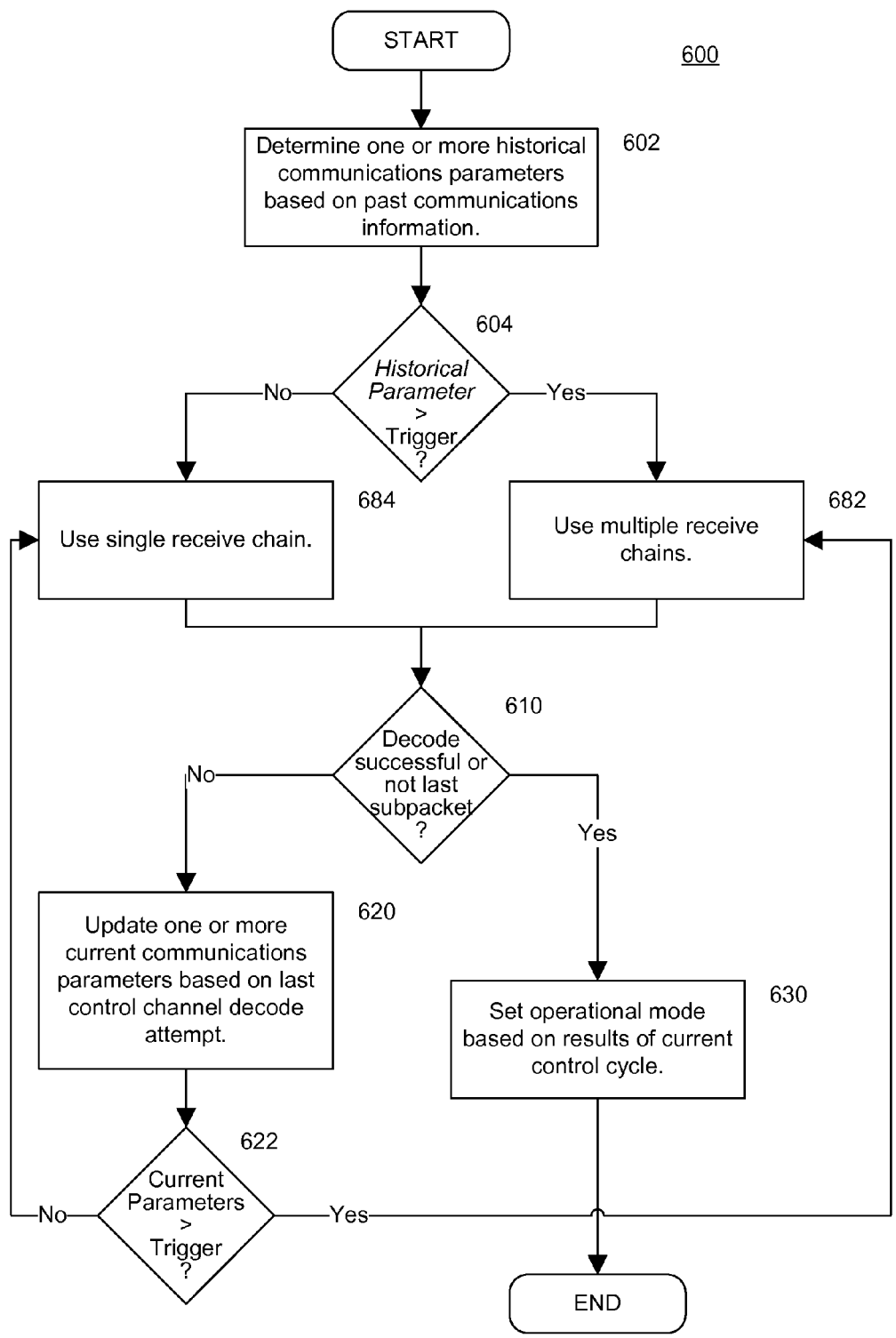
FIG. 6 is a flow diagram of a generalized RxD optimization approach for controlling enablement of one or more receive chains for decoding a control channel according to some embodiments of the present invention.

Although the generalized RxD optimization for control channel acquisition process 600 has been provided and described in FIG. 6, it may be beneficial to examine specific examples of processes for RxD optimization for control channel acquisition. The RxD optimization for control channel acquisition processes described in FIGS. 7-11 provide some of these examples for the wireless device 200 operating in a discontinuous reception, or idle, mode. It should be noted that the generalized RxD optimization for control channel acquisition process 600 may be applied to other wireless device states, including if the wireless device 200 is in an access state, an example of which is described in FIG. 12.

Figure 7:
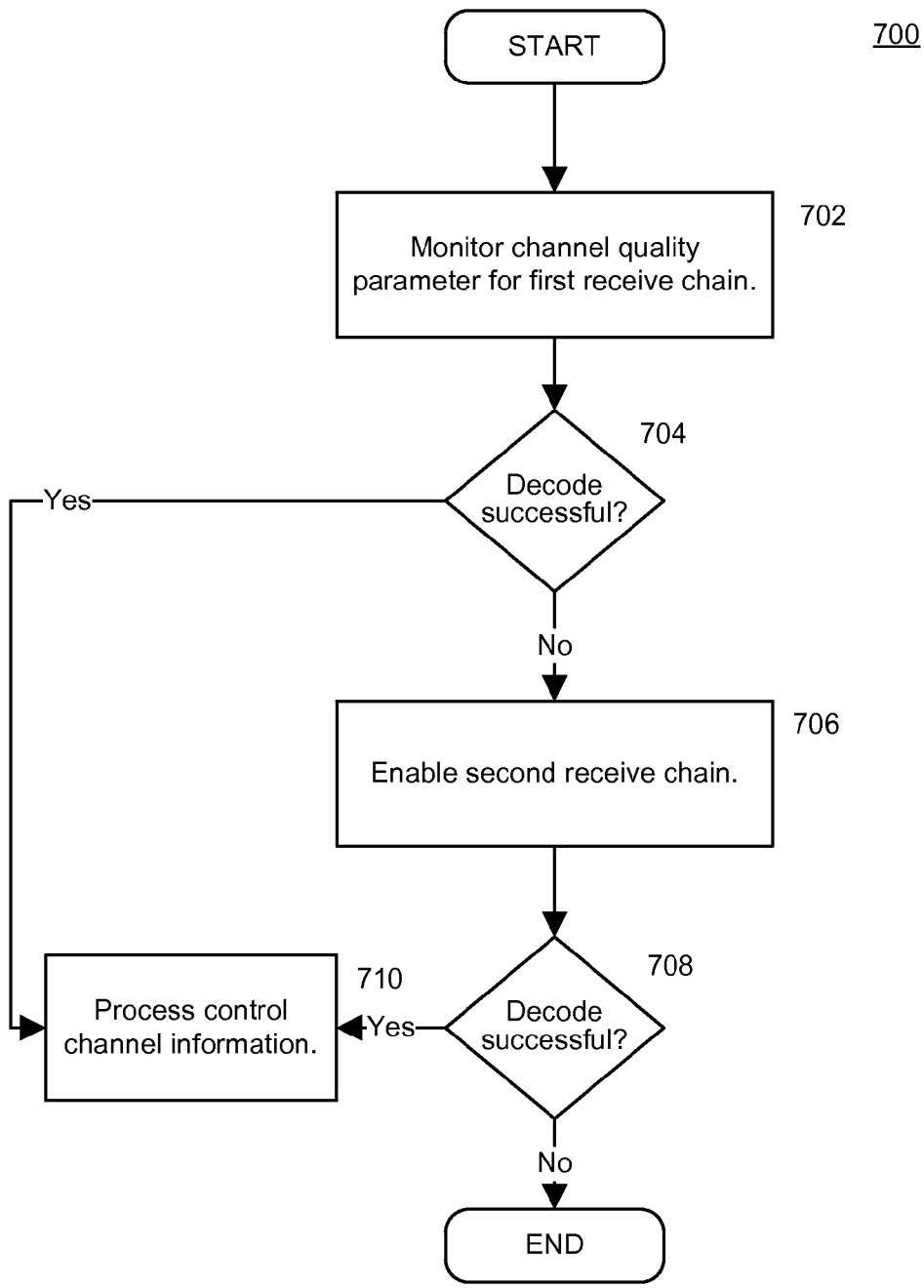
FIG. 7 is a flow diagram of a first RxD optimization approach based on the generalized RxD optimization approach of FIG. 6, where one receive chain is initially enabled for decoding a control channel according to some embodiments of the present invention.

FIG. 7 illustrates a RxD optimization for control channel acquisition process 700 where a wireless device such as the wireless device 200 may start with one receive chain, such as the first receive chain 305, being enabled to acquire a control channel in a control interval such as the control interval 504. The RxD optimization for control channel acquisition process 700 may be considered a specific application of the generalized RxD optimization for control channel acquisition process 600. In one aspect of the disclosed approach, a determination may be made to see if one or more other receive chains, such as the second receive chain 310, should be enabled based on a threshold for a channel quality parameter. The threshold may be a channel quality parameter threshold necessary to decode the control channel.

At 702, the RxD optimization process 700 starts monitoring the channel quality parameter for the first receive chain 305. As a non-limiting example, an SNR-based parameter such as an energy per bit to noise power ratio ($E_b/N_0$) may be used as the channel quality parameter. However, it should be understood that any SNR parameter may be used. After the channel quality parameter for the first receive chain 305 starts to be monitored, operation continues with 704.

At 704, a channel quality parameter threshold may be defined and the monitored channel quality parameter of the first receive chain 305 may be compared to the channel quality parameter threshold to determine if the channel quality parameter of the first receive chain 305 is within a range below the channel quality parameter threshold after an X-number of subpackets. If the channel quality parameter of the first receive chain 305 is within a range below the channel quality parameter threshold after the X-number of subpackets, then the second receive chain 310 should be enabled. In one aspect of the disclosed approach, the channel quality parameter threshold represents a minimal level of $E_b/N_0$ needed to decode the control channel, plus a gap amount to account for an assumption that if only a little bit more $E_b/N_0$ is needed for a successful decode, and a single receive chain is likely to provide that extra $E_b/N_0$ in the next subpacket, then it may not be advisable to enable the second receive chain 310. Further, if the difference between the $E_b/N_0$ of the first receive chain 305 and the $E_b/N_0$ threshold is very high, it may also not be advisable to enable the second receive chain 310 because, most likely, the channel conditions are so poor that the second receive chain 310 may not increase received power nor increase the overall $E_b/N_0$. Thus, if the $E_b/N_0$ of the first receive chain 305 is within a range below the $E_b/N_0$ threshold, then the second receive chain 310 may be enabled and operation continues with 706. As a non-limiting example, the second receive chain 310 may be enabled for attempting to receive a 5-th subpacket if the $E_b/N_0$ of the first receive chain 305 is less than 3dB from the $E_b/N_0$ threshold. The difference of less than 3 dB between the first receive chain 305 and the $E_b/N_0$ threshold indicates that use of the first receive chain 305 alone is not enough to decode the control channel after the receipt of a 4-th subpacket, but the difference is small enough such that RxD may be used to compensate for poor channel conditions.

In a more general application of the channel quality parameter threshold, a look-up table may be pre-defined with indexes of a number of received subpackets along with an associated SNR range to allow for a determination of whether the second receive chain 310 should to be enabled. As a non-limiting example, the look-up table may be designed from empirical lab measurements or computational simulations.

At 706, the second receive chain 310 may be enabled to assist the first receive chain 305 to attempt to decode the control channel in RxD. In another aspect of the disclosed approach, as previously noted, more than one receive chain from the second receive chain 310 through the n-th receive chain 315 may be enabled. Operation then continues with 708.

At 708, it is determined if the control channel may be decoded through the use of multiple receive chains such as the first receive chain 305 and the second receive chain 310 in RxD. If the control channel may be decoded using RxD, then operation continues with 710. Otherwise, operation ends and the wireless device 200 may await the next control interval.

At 710, if it is determined that the control channel has been decoded by either using only the first receive chain 305 at 704, or using RxD at 708, then the wireless device 200 may continue normal operation based on information received in the control channel. Thus, for example, the information may indicate that the wireless device 200 has no data to receive for this control cycle, and thus the wireless device 200 may return to the sleep mode.

Figure 8:
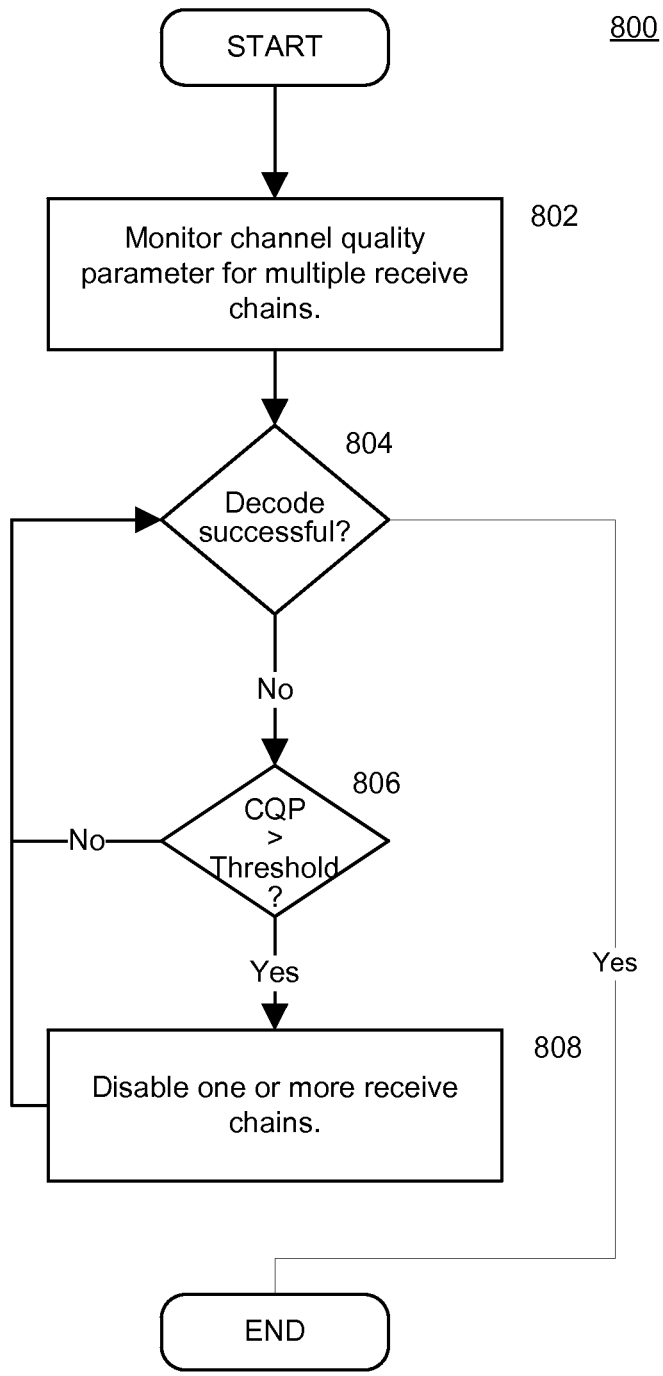
FIG. 8 is a flow diagram of a second RxD optimization approach based on the generalized RxD optimization approach of FIG. 6, where multiple receive chains are initially enabled for decoding a control channel according to some embodiments of the present invention.

FIG. 8 illustrates a RxD optimization for control channel acquisition process 800 where a wireless device such as the wireless device 200 may start with two or more receive chains, such as the first receive chain 305 and the second receive chain 310, being enabled to acquire a control channel in a control interval such as the control interval 504. The RxD optimization for control channel acquisition process 800 may be considered a specific application of the generalized RxD optimization for control channel acquisition process 600.

At 802, the RxD optimization process 800 starts monitoring a channel quality parameter for the multiple receive chains. As a non-limiting example, an SNR-based parameter may be used as the channel quality parameter. However, it should be understood that any SNR parameter may be used. After the channel quality parameter begins to be monitored, operation continues with 804.

At 804, it is determined if the control channel may be decoded through the use of the currently enabled receive chains. For example, upon the first iteration, the first receive chain 305 and the second receive chain 310 may be the receive chains enabled for decoding the control channel. In later iterations, as discussed herein, the first receive chain 305 may be the only receive chain enabled after any other receive chains have been disabled in 808. If the control channel may be decoded, then operation ends. Additionally, operation ends when there are no other subpackets of the control channel to be decoded. Otherwise, operation continues to 806, where additional receive chains may be disabled for the next subpacket if the channel quality parameter is still above the channel quality threshold.

At 806, in one aspect of the disclosed approach, a determination may be made to see if one or more receive chains of the multiple receive chains should be disabled based on a threshold for the channel quality parameter. The threshold may be a channel quality parameter threshold necessary to decode the control channel using a single receive chain such as the receive chain 305. As a non-limiting example, an SNR threshold may be monitored as the channel quality parameter threshold, and if the channel quality parameter, SNR, appears high enough to successfully decode the control channel using only the receive chain 305, then operation continues at 806. However, if the channel quality parameter, SNR, appear to be too low, then multiple receive chains may remain enabled. In other aspects of the disclosed approach, additional tests and operations may be used as part of the determination, such as, for example, an additional rule to indicate that only one reduction to the number of multiple receive chains may be made within a single control cycle, to reduce complexity in implementation.

At 808, where it has been determined that the channel quality parameter is higher than the channel quality parameter threshold at 806, then one or more receive chains of the multiple receive chains may be disabled until only the first receive chain 305 remains enabled. For example, it may be that only the single receive chain 305 may be used to decode the control channel once the other receive chains have been disabled based on the operation at 806. Operation then returns to with 804.

FIG. 900 illustrates an adaptive RxD optimization for control channel acquisition process 900 where a wireless device such as the wireless device 200 may adaptively determine a number of receive chains that may be enabled to acquire a control channel in a control interval such as the control interval 504 for a first subpacket of the control channel. In one aspect of the disclosed approach, a determination may involve the use of a first set of criteria for the first subpacket of the control channel, as shown in FIG. 900, and may use a different set of criteria for subsequent subpackets of the control channel, as shown in FIG. 1000.

At 902, a number K of subpackets that was used to decode the control channel from the previous control interval is determined. Operation then continues with 904.

At 904, it is determined if multiple receive chains were used in the previous control interval. If multiple receive chains were used, then operation continues with 920. Otherwise, operation continues with 910.

At 910, when a single receive chain was used in the previous control interval, a prediction of a number L of subpackets that may be needed by the use of a single receive chain to decode the control channel in this control interval such that:

$$L=\text{ceiling}(K/(1+\text{alpha})),$$

where alpha is an assumed diversity gain of how much additional energy may be collected if additional receive chains, such as the second receive chain 310, is enabled; and "ceiling" is an integer function where a fractional part rounds up to the next integer. As an example, it may be assumed that the second receive chain 310 may provide 100% additional energy, which might be accurate if the second antenna has equal gain to, and is uncorrelated from, the first antenna. Of course, 100% may not be achievable and this assumed diversity gain may be adjusted to bias toward a determination to either use a single receive chain or multiple receive chains. In addition, the assumed diversity gain may be adjusted based on other parameters, such as, for example, when the SNR of one or both of the antennas is relatively low. The adaptive approach may also assume that a Signal to Interference-plus-Noise ratio (SINR) is substantially equal from one packet to the next in a manner similar to that discussed above in relative to $E_b/N_0$ determinations. Thus, for an alpha of zero, the prediction L would indicate how many subpackets are needed to decode the control channel with a single receive chain. Conversely, for a non-zero alpha, where energy from a second (or multiple) receive chain(s) is(are) considered, the prediction L of the number of subpackets needed to decode the control channel should be lower than the prediction L for a single receive chain.

At 912, a determination may be made if the predicted number of subpackets needed to decode the control channel from using multiple receive chains is less than the number of packets necessary in a previous control interval to decode the interval based on:

$$L \times (1+x) < K,$$

where L and K are as described above, and x indicates the extra energy needed to power the second receive chain (e.g., 30%). If L×(1+x) is less than K, then using multiple receive chains may save power because the number L of subpackets predicted to be needed to decode the control channel using multiple receive chains is less than number K of subpackets previously needed to decode the control channel, even where the prediction is adjusted by an increased power consumption factor x for additional receive chains. If multiple receive chains are to be used, operation continues at 916. Otherwise, operation continues at 914.

At 914, only a single receive chain such as the first receive chain 305 is enabled for decoding the control channel.

At 916, multiple receive chains are enabled for decoding the control channel.

Returning to 904, if multiple receive chains were used in the previous control interval, then at 920, an SNR value may be determined for: each of the receive chains, such as SNR_0 for the first antenna, and SNR_1 for the second antenna; and an SNR_both for both antennas. These SNRs may all be determined in the linear domain. It may then be determined that if the first receive chain is used, the control channel may be expected to be decoded at a predicted number L_0 of subpackets represented by:

$$L\_0=\text{ceiling}(K \times SNR\_\text{both}/SNR\_0).$$

Note that L_0 may be larger than K if SNR_both is larger than the SNR_0.

Similarly, a predicted number of packets L_1 necessary to decode the control channel using only the second receive chain is represented by:

$$L\_1=\text{ceiling}(K \times SNR\_\text{both}/SNR\_1).$$

subpackets. With these determinations, if L_0 or L_1 is 8 or close to 8, it may be advisable to just use both receive channels because the control channel may be successfully decode with a single receive channel.

If either L_0 or L_1 is smaller than K×(1+x), which represents the power consumption for decoding the previous number K of subpackets using both antennas, then either one of the receive chains with a value less than the power consumption for decoding the previous number K of subpackets using both antennas may be used, and operation continues with 924. Otherwise, both receive channels may be used and operation continues at 916.

At 924, either of the two receive chains that has a predicted number L_0 or L_1 of packets needed to decode the control channel in the current control interval that is lower than the previous number K of packets necessary to decode the control channel may be used in an attempt to decode the control channel for the first subpacket in the current control interval.

At 930, it is determined if the first subpacket is successfully decoded. If so, then operation ends. Otherwise, operation continues with FIG. 10.

In some aspects of the disclosed approach, decisions for whether multiple receive chains may be used for the first subpacket may be simplified. As a non-limiting example, assumptions may be made that there are uncorrelated antennas, that the SNR is the same across both antennas, that there are substantially no spatial nulling effects, and that x, the power associated with the second receive chain, equals 30%. With these assumptions, if a single receive chain was used in the previous control interval and the number K of subpackets needed to decode the control channel in the previous control interval is greater 1, then the second receive chain may be enabled. Otherwise, if K is equal to 1, only the first receive chain may be enabled because it appears that the first receive chain may be capable of decoding the control channel using just one subpacket. Alternatively, with these assumptions, if both receive chains were used in the previous control interval and the number K of subpackets needed to decode the control channel in the previous control interval is greater 1, then both receive chain may remained enabled. Otherwise, if K is equal to 1, only the first receive chain may be enabled because it appears that the first receive chain may be capable of decoding the control channel. This determination may cause some ping-ponging between using one or two receive chains, but the loss should be small and power savings should still result. Alternatively, the algorithm may track the SNR of the channel from the last control interval and compare that to a threshold to decide whether to keep both receive channels enabled.

Figure 9:
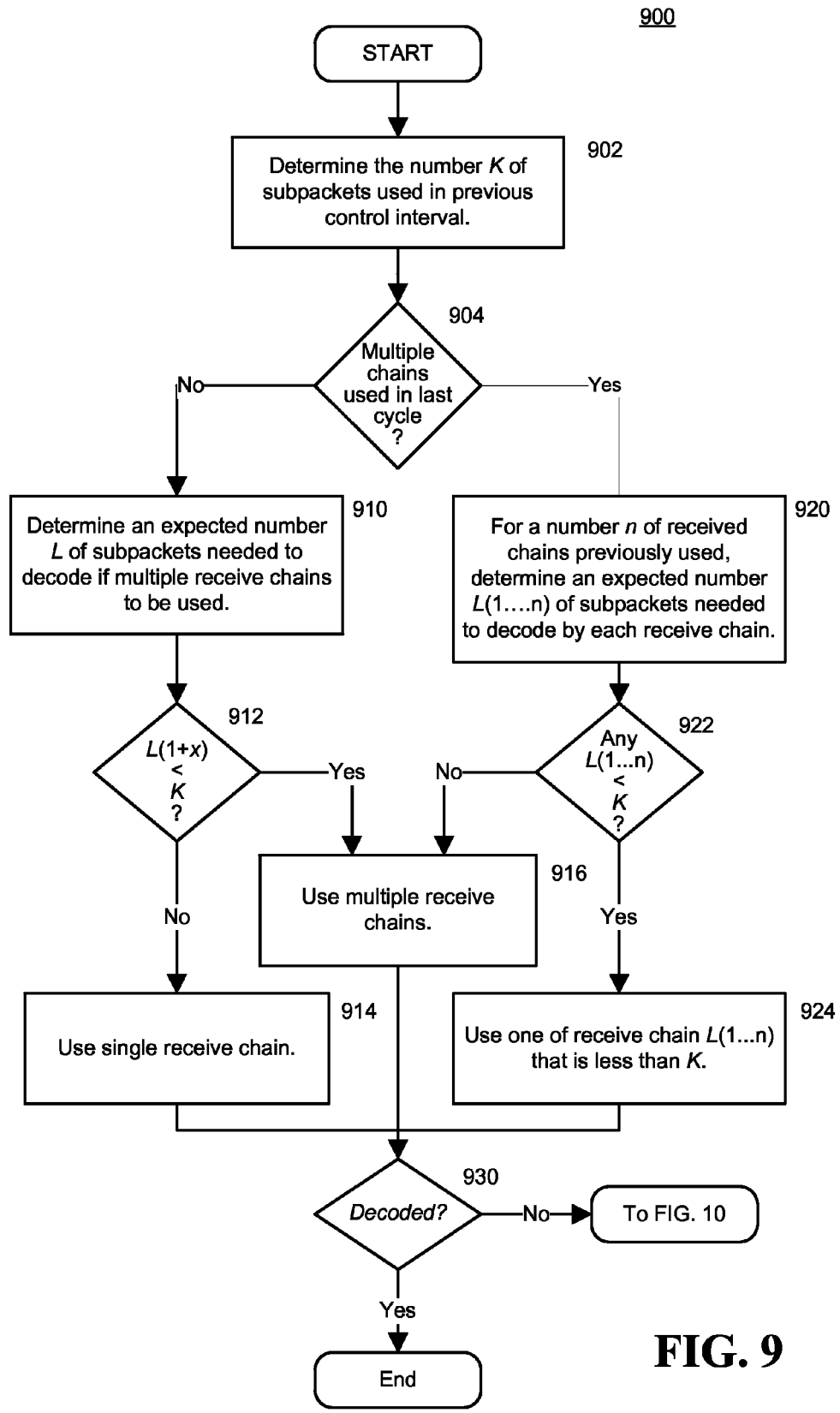
FIG. 9 is flow diagram of a third RxD optimization approach based on the generalized RxD optimization approach of FIG. 6, where a number of receive chains is initially enabled for decoding a first subpacket of a control channel based on a number of receive chains enabled in a previous cycle according to some embodiments of the present invention.
Figure 10:
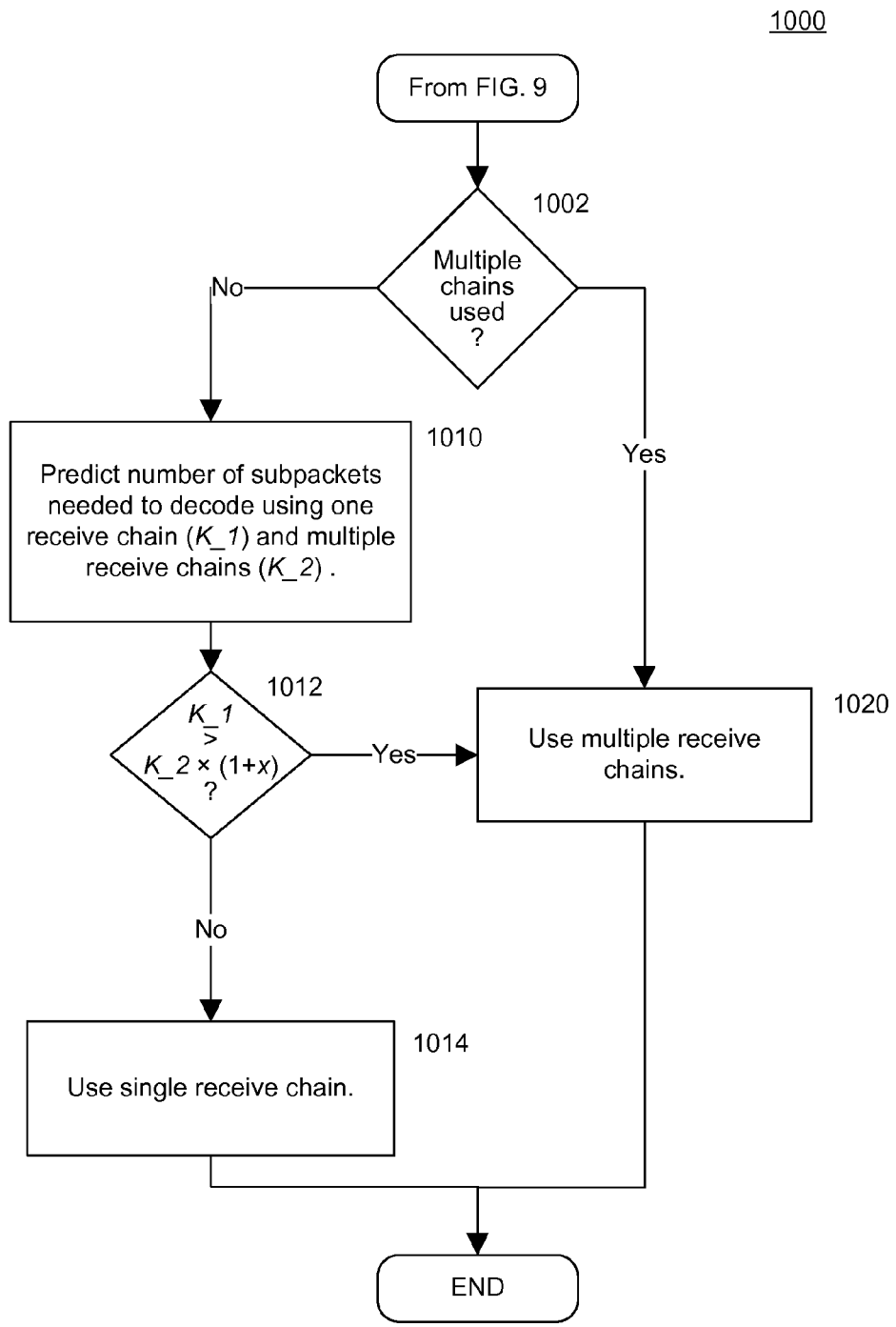
FIG. 10 is flow diagram that is a continuation of the third RxD optimization approach of FIG. 9 where a number of receive chains is initially enabled for decoding subpackets after the first subpacket of FIG. 9 of the control channel according to some embodiments of the present invention.

FIG. 1000 illustrates an adaptive RxD optimization for control channel acquisition process 1000 that is a continuation of the adaptive RxD optimization process 900 of FIG. 9, after the first subpacket of the control channel. That is, the adaptive RxD optimization for control channel acquisition process 1000 is a continuation of the adaptive RxD optimization for control channel acquisition process 900 where the control channel has not been successfully decoded by the first subpacket.

For subsequent packets after the first subpacket, the adaptive approach may consider whether it is advisable to switch from one to two antennas. At 1002, if multiple receive chains were enabled during the (unsuccessful) attempted decoding of the control channel during a previous subpacket (such as the first subpacket), then the multiple receive chains may remain enabled for the rest of the subpackets in the current control interval at 1020. Thus, for example, multiple receive chains may remain enabled if the previous subpackets were not successfully decoded. Otherwise, if only a single receive chain was used to decode the first subpacket, then operation will continue at 1010.

At 1010, where a single receive chain was currently used for the previous subpacket, a value $E_b/N_0$_unit, which represents an average $E_b/N_0$ from the previous K subpackets, is determined. A remaining $E_b/N_0$ needed to decode the control channel may also be defined as Eb/No_remain. A prediction that a K_1 number of subpackets may be needed to decode the control channel may be represented by:

$$K\_1 = \text{ceiling}(Eb/No\_remain/E_b/N_0\_unit),$$

where it is assumed only one receive chain will be used.

Further, a prediction that a K_2 number of subpackets may be needed to decode the control channel may be represented by:

$$K\_2 = \text{ceiling}(Eb/No\_remain/(E_b/N_0\_unit \times (1+alpha))),$$

where it is assumed that multiple receive chains will be used.

With K_1 and K_2 determined, the second receive chain may be enabled for attempting to decode the upcoming subpacket of the control channel if:

$$K\_1 > K\_2 \times (1+x),$$

where x has been previously defined and operation continues at 1020. Otherwise, the second receive chain may be left disabled and only a single receive chain will be used for attempting to decode the upcoming subpacket of the control channel at 1014.

Figure 11:
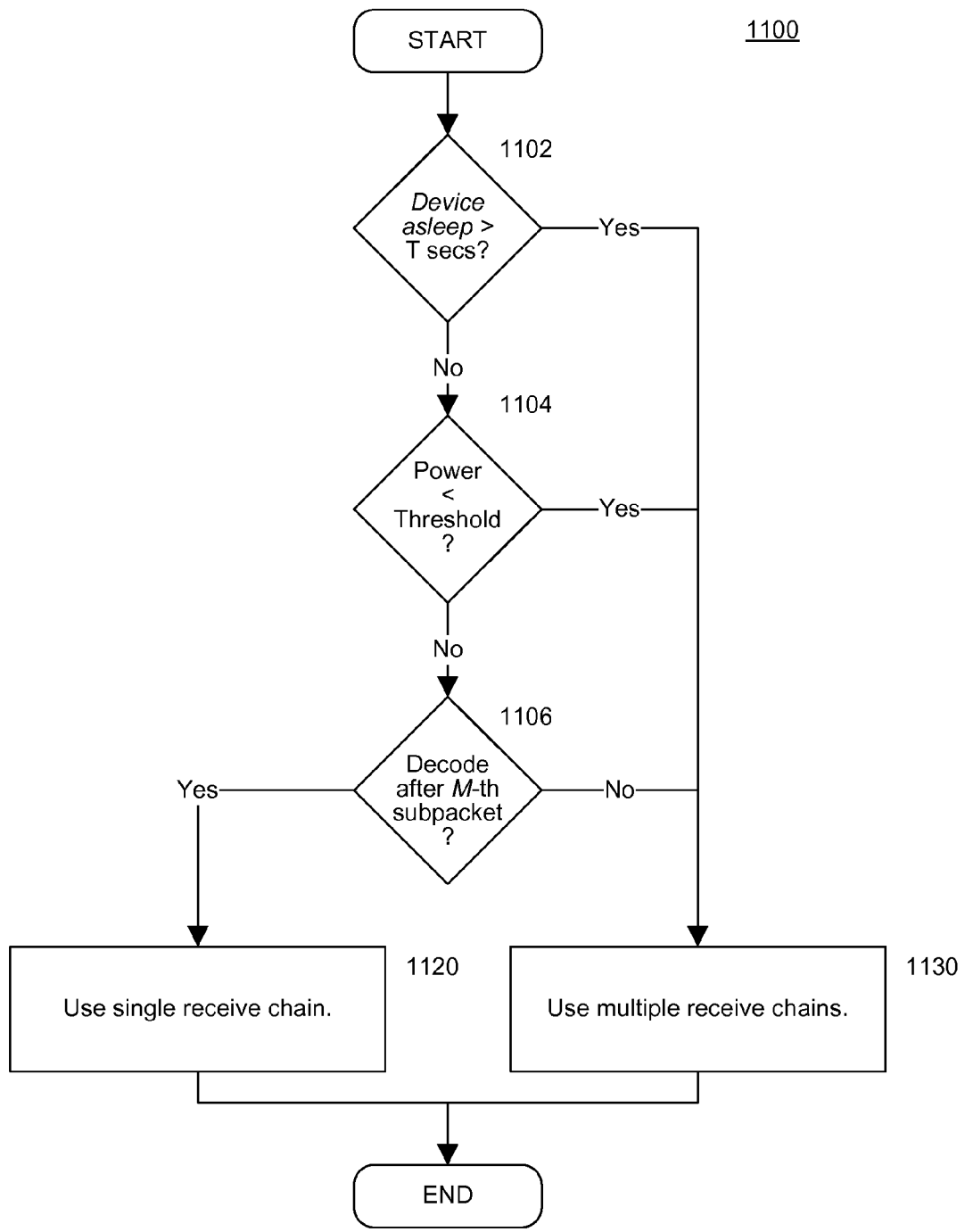
FIG. 11 is flow diagram of a fourth RxD optimization approach based on the generalized RxD optimization approach of FIG. 6, where a number of receive chains is enabled for decoding a control channel based on a hybrid approach in accordance with some embodiments of the present invention.
Figure 12:
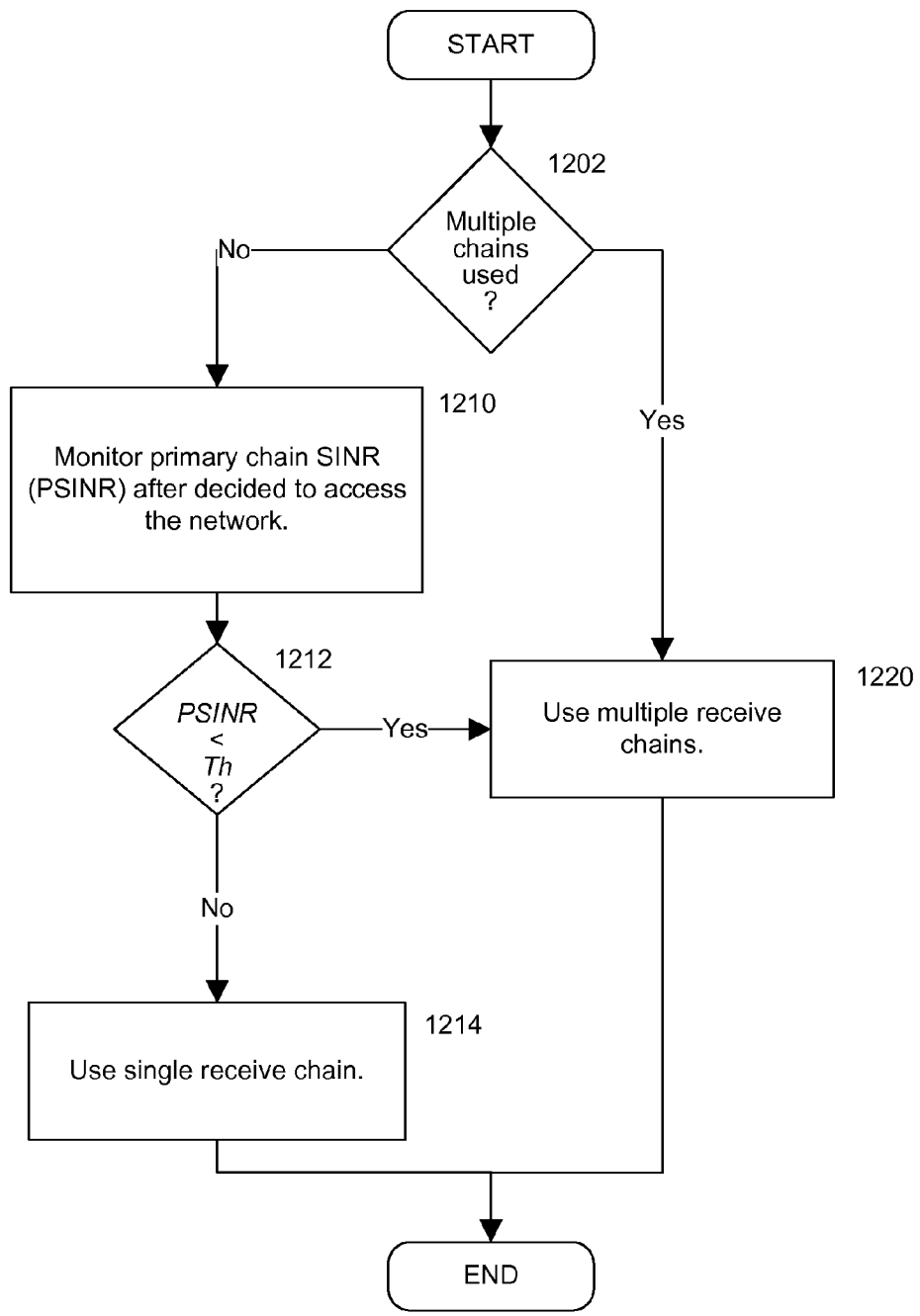
FIG. 12 is flow diagram a fifth RxD optimization approach based on the generalized RxD optimization approach of FIG. 6, where a number of receive chains is enabled for communication during an access state in accordance with some embodiments of the present invention.

FIG. 11 illustrates an adaptive RxD optimization for control channel acquisition process 1100 where a wireless device such as the wireless device 200 may adaptively determine a number of receive chains that may be enabled to acquire a control channel based on a variety of parameters, including historical information. In this example, one historical information used to decide on enabling multiple receive chains during wake-up of the wireless device 200 at the current control cycle includes whether multiple receive chains were used in the previous control cycle.

At 1102, multiple receive chains are enabled if it is determined that the wireless device 200 has been in continuous sleep state for more than T seconds. In a non-limiting example, T is equal to 5.12 seconds, which is one complete EV-DO control channel period. Operation then continues at 1130 if multiple receive chains are to be enabled. Otherwise, operation continues at 1104.

At 1104, a Peak SINR (PSINR) is captured at wake-up, which may be averaged over all previous PSINR captures. Multiple receive chains are enabled for a control interval if it is determined that:

$$((PSINR < Th1) \text{ or (Sync } CC \text{ not detected)}),$$

where, in a non-limiting example, Th1=−3 dB and the detection of Sync CC is based on the previous control interval. Operation then continues at 1130 if multiple receive chains are to be enabled. Otherwise, operation continues at 1106.

At 1106, multiple receive chains may be enabled during the current control interval if it is determined that the control channel has not been decoded after the M-th subpacket. In a non-limiting example, M is equal to 4. In one aspect of the disclosed approach, once enabled, the multiple receive chains will remain enabled for the rest of that control interval. For example, multiple receive chains may remain enabled for the remainder of the packets in the current Sync CC capsule. Operation then continues at 1130 if multiple receive chains are to be enabled. Otherwise, operation continues at 1120.

At 1130, multiple receive chains are enabled and used to attempt to decode the control channel.

At 1120, only a single receive chain is enabled for use to attempt to decode the control channel.

FIG. 1200 illustrates an adaptive RxD optimization for control channel acquisition process 1200 for a wireless device, such as wireless device 200, that is entering into an access state. The purpose of the access state is for the wireless device to establish a connection with the base station. A wireless device may enter into the access state after it receives a page on the control channel. The wireless device may also enter into the access state after it transmits an access probe to request permission to transmit data.

At 1202, if multiple receive chains are already enabled for any reason, then the multiple receive chains may remain enabled and operation ends. Otherwise, if only a single receive chain is enabled, then operation will continue at 1210.

At 1210, where a single receive chain is currently enabled, a SINR value such as a PSINR value is monitored after the wireless device 200 decides to access the network by transmitting the access probe. Operation then continues at 1212.

At 1212, it is determined if the PSINR value is below a threshold value in accordance with:

$$PSINR < Th,$$

where Th is −3 dB in one non-limiting example. If the PSINR value is below the threshold Th, then operation continues at 1220, where multiple receive chains may be enabled. Otherwise, only a single receive chain may be enabled at 1214.

In various aspects of the disclosed approach, once RxD is enabled in access state, multiple receive chains may remain enabled for the duration that the wireless device remains in the active state.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

In the description, elements, circuits, and functions may be shown in block diagram form in order not to obscure the disclosed approach in unnecessary detail. Conversely, specific implementations shown and described are exemplary only and should not be construed as the only way to implement the disclosed approach unless specified otherwise herein. Additionally, block definitions and partitioning of logic between various blocks is exemplary of a specific implementation. It is readily apparent to one of ordinary skill in the art that the disclosed approach may be practiced by numerous other partitioning solutions. For the most part, details concerning timing considerations and the like have been omitted where such details are not necessary to obtain a complete understanding of the disclosed approach and are within the abilities of persons of ordinary skill in the relevant art.

Also, it is noted that the aspects may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosed approach may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, aspects may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing aspects described herein, is considered a special purpose processor for carrying out such aspects. Similarly, a general-purpose computer is considered a special purpose computer when configured for carrying out aspects described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing aspects are merely examples and are not to be construed as limiting the invention. The description of the aspects is intended to be illustrative, and not to limit the scope of the claims. As such, the present teachings can be readily applied to other types of apparatuses and many alternatives, modifications, and variations will be apparent to those skilled in the art.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. An apparatus for wireless communications comprising:
   a plurality of receive chains for receiving communications from a wireless node; and
   a control module, operably coupled with the plurality of receive chains to manage the plurality of receive chains configured to operate in a discontinuous reception mode comprising a plurality of control cycles, each control cycle comprising at least one control interval, wherein the control module is configured to:
      during a control interval within a current control cycle of the plurality of control cycles, retrieve historical communications information for the apparatus determined during a control interval within a previous control cycle of the plurality of control cycles, separate from the current control cycle;
      during the control interval within the current control cycle, determine a number of receive chains from the plurality of receive chains to enable based on the historical communications information; and
      during the control interval within the current control cycle, enable the number of receive chains to receive, during the control interval within the current control cycle, a communication from the wireless node.

2. The apparatus of claim 1, wherein the control module is further configured to:
   monitor a set of communications parameters during a reception of the communication from the wireless node in the current control cycle; and
   change the number of receive chains to enable based on the set of communications parameters.

3. The apparatus of claim 2, wherein the change to the number of receive chains to enable comprises a change to the number of receive chains when the set of communications parameters does not meet a threshold.

4. The apparatus of claim 2, wherein the set of communications parameters comprises a signal-to-noise ratio (SNR).

5. The apparatus of claim 4, wherein the SNR comprises a separate SNR for at least one receive chain.

6. The apparatus of claim 1, wherein each control interval comprises a transmission of a plurality of subpackets, and the retrieval of the historical communications information comprises retrieving communications information from a previous transmission of at least one of the plurality of subpackets.

7. The apparatus of claim 6, wherein the previous transmission of the at least one of the plurality of subpackets is from a previous control cycle in the plurality of control cycles.

8. The apparatus of claim 6, wherein each plurality of subpackets for a control interval is associated with a control channel and the historical communications information comprises a number of subpackets needed to decode the control channel from a previous control cycle in the plurality of control cycles.

9. The apparatus of claim 1, wherein the number of receive chains to enable is at least two if a previous number of receive chains that were enabled in the previous control cycle is greater than one.

10. The apparatus of claim 1, wherein the historical communications information comprises a predicted SNR threshold for successful decoding of the communication from the wireless node.

11. The apparatus of claim 1, wherein the historical communications information comprises a predicted power expenditure of each of the plurality of receive chains to be enabled.

12. The apparatus of claim 1, wherein the historical communications information comprises a previous number of receive chains that were enabled for the previous control cycle.

13. The apparatus of claim 1, wherein the historical communications information comprises at least one of a total signal strength, an SNR, or a received signal strength indicator (RSSI).

14. The apparatus of claim 13, wherein the total signal strength comprises at least one of a target signal, interference, or noise.

15. The apparatus of claim 13, wherein the SNR comprises a separate SNR for at least one receive chain.

16. A method for wireless communications comprising:
   receiving, utilizing at least one receive chain from a plurality of receive chains, communications from a wireless node while operating in a discontinuous reception mode comprising a plurality of control cycles, each control cycle comprising at least one control interval;
   during a control interval within a current control cycle of the plurality of control cycles, retrieving historical communications information determined during a control interval within a previous control cycle of the plurality of control cycles, separate from the current control cycle;
   during the control interval within the current control cycle, determining a number of receive chains from the plurality of receive chains to enable based on the historical communications information; and
   during the control interval within the current control cycle, enabling the number of receive chains to receive, during the control interval within the current control cycle, a communication from the wireless node.

17. The method of claim 16, further comprising:
   monitoring a set of communications parameters during a reception of the communication from the wireless node in the current control cycle; and
   changing the number of receive chains to enable based on the set of communications parameters.

18. The method of claim 17, wherein changing the number of receive chains to enable comprises changing the number of receive chains when the set of communications parameters does not meet a threshold.

19. The method of claim 17, wherein the set of communications parameters comprises a signal-to-noise ratio (SNR).

20. The method of claim 19, wherein the SNR comprises a separate SNR for at least one receive chain.

21. The method of claim 16, wherein each control interval comprises a transmission of a plurality of subpackets, and the retrieving the historical communications information comprises retrieving communications information from a previous transmission of at least one of the plurality of subpackets.

22. The method of claim 21, wherein the previous transmission of the at least one of the plurality of subpackets is from a previous control cycle in the plurality of control cycles.

23. The method of claim 21, wherein each plurality of subpackets for a control interval is associated with a control channel and the historical communications information comprises a number of subpackets needed to decode the control channel from the previous control cycle in the plurality of control cycles.

24. The method of claim 16, wherein the number of receive chains to enable is at least two if a previous number of receive chains that were enabled in the previous control cycle is greater than one.

25. The method of claim 16, wherein the historical communications information comprises a predicted SNR threshold for successful decoding of the communication from the wireless node.

26. The method of claim 16, wherein the historical communications information comprises a predicted power expenditure of each of the plurality of receive chains to be enabled.

27. The method of claim 16, wherein the historical communications information comprises a previous number of receive chains that were enabled for the previous control cycle.

28. The method of claim 16, wherein the historical communications information comprises at least one of a total signal strength, an SNR, or a received signal strength indicator (RSSI).

29. The method of claim 28, wherein the total signal strength comprises at least one of a target signal, interference, or noise.

30. The method of claim 28, wherein the SNR comprises a separate SNR for at least one receive chain.

31. An apparatus for wireless communications comprising:
a plurality of receive chains for receiving communications from a wireless node while operating in a discontinuous reception mode comprising a plurality of control cycles, each control cycle comprising at least one control interval;
means for retrieving, during a control interval within a current control cycle of the plurality of control cycles, historical communications information determined during a control interval within a previous control cycle of the plurality of control cycles, separate from the current control cycle;
means for determining, during the control interval within the current control cycle, a number of receive chains from the plurality of receive chains to enable based on the historical communications information; and
means for enabling, during the control interval within the current control cycle, the number of receive chains to receive, during the control interval within the current control cycle, a communication from the wireless node.

32. The apparatus of claim 31, further comprising:
means for monitoring a set of communications parameters during a reception of the communication from the wireless node in the current control cycle; and
means for changing the number of receive chains to enable based on the set of communications parameters.

33. The apparatus of claim 32, wherein the means for changing the number of receive chains to enable comprises means for changing the number of receive chains when the set of communications parameters does not meet a threshold.

34. The apparatus of claim 32, wherein the set of communications parameters comprises a signal-to-noise ratio (SNR).

35. The apparatus of claim 34, wherein the SNR comprises a separate SNR for at least one receive chain.

36. The apparatus of claim 31, wherein the historical communications information comprises a predicted SNR threshold for successful decoding of the communication from the wireless node.

37. The apparatus of claim 31, wherein the historical communications information comprises a predicted power expenditure of each of the plurality of receive chains to be enabled.

38. The apparatus of claim 31, wherein the historical communications information comprises a previous number of receive chains that were enabled for the previous control cycle.

39. The apparatus of claim 31, wherein each control interval comprises a transmission of a plurality of subpackets, and the means for retrieving the historical communications information comprises means for retrieving communications information from a previous transmission of at least one of the plurality of subpackets.

40. The apparatus of claim 39, wherein the previous transmission of the at least one of the plurality of subpackets is from a previous control cycle in the plurality of control cycles.

41. The apparatus of claim 39, wherein each plurality of subpackets for a control interval is associated with a control channel and the historical communications information comprises a number of subpackets needed to decode the control channel from the previous control cycle in the plurality of control cycles.

42. The apparatus of claim 31, wherein the number of receive chains to enable is at least two if the previous number of receive chains that were enabled in the previous control cycle is greater than one.

43. The apparatus of claim 31, wherein the historical communications information comprises at least one of a total signal strength, an SNR, or a received signal strength indicator (RSSI).

44. The apparatus of claim 43, wherein the total signal strength comprises at least one of a target signal, interference, or noise.

45. The apparatus of claim 43, wherein the SNR comprises a separate SNR for at least one receive chain.

46. A computer program product for wireless communications comprising:
a non-transitory machine-readable storage medium comprising instructions executable for:
receiving, utilizing at least one receive chain from a plurality of receive chains, communications from a wireless node while operating in a discontinuous reception mode comprising a plurality of control cycles, each control cycle comprising at least one control interval;
during a control interval within a current control cycle of the plurality of control cycles, retrieving historical communications information determined during a control interval within a previous control cycle of the plurality of control cycles, separate from the current control cycle;

during the control interval within the current control cycle, determining a number of receive chains from the plurality of receive chains to enable based on the historical communications information; and during the control interval within the current control cycle, enabling the number of receive chains to receive, during the control interval within the current control cycle, a communication from the wireless node.

47. The computer program product of claim 46, wherein the non-transitory machine-readable storage medium further comprises instructions executable for:

monitoring a set of communications parameters during a reception of the communication from the wireless node in the current control cycle; and changing the number of receive chains to enable based on the set of communications parameters.

48. The computer program product of claim 47, wherein the instructions executable for changing the number of receive chains to enable comprises instructions executable for changing the number of receive chains when the set of communications parameters does not meet a threshold.

49. The computer program product of claim 47, wherein the set of communications parameters comprises a signal-to-noise ratio (SNR).

50. The computer program product of claim 49, wherein the SNR comprises a separate SNR for at least one receive chain.

51. The computer program product of claim 46, wherein the historical communications information comprises a predicted SNR threshold for successful decoding of the communication from the wireless node.

52. The computer program product of claim 46, wherein the historical communications information comprises a predicted power expenditure of each of the plurality of receive chains to be enabled.

53. The computer program product of claim 46, wherein the historical communications information comprises a previous number of receive chains that were enabled for the previous control cycle.

54. The computer program product of claim 46, wherein each control interval comprises a transmission of a plurality of subpackets, and the instructions for retrieving the historical communications information comprise instructions for retrieving communications information from a previous transmission of at least one of the plurality of subpackets.

55. The computer program product of claim 54, wherein the previous transmission of the at least one of the plurality of subpackets is from the previous control cycle in the plurality of control cycles.

56. The computer program product of claim 54, wherein each plurality of subpackets for a control interval is associated with a control channel and the historical communications information comprises a number of subpackets needed to decode the control channel from the previous control cycle in the plurality of control cycles.

57. The computer program product of claim 46, wherein the number of receive chains to enable is at least two if a previous number of receive chains that were enabled in the previous control cycle is greater than one.

58. The computer program product of claim 46, wherein the historical communications information comprises at least one of a total signal strength, an SNR, or a received signal strength indicator (RSSI).

59. The computer program product of claim 58, wherein the total signal strength comprises at least one of a target signal, interference, or noise.

60. The computer program product of claim 58, wherein the SNR comprises a separate SNR for at least one receive chain.

* * * * *